Nov. 8, 1927.
C. C. CALKINS
1,648,538
MACHINE FOR TREATING SEED GRAIN
Filed Nov. 23, 1922
2 Sheets-Sheet 1
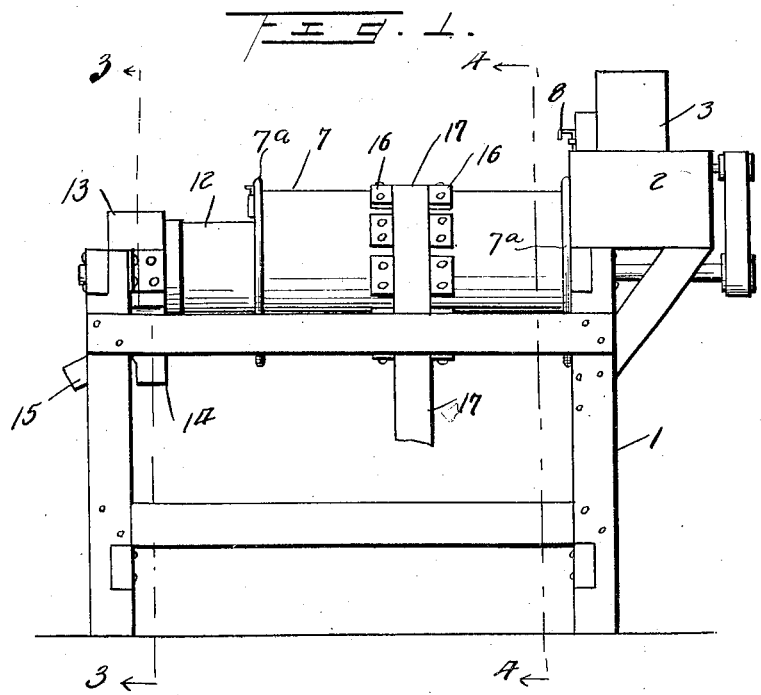
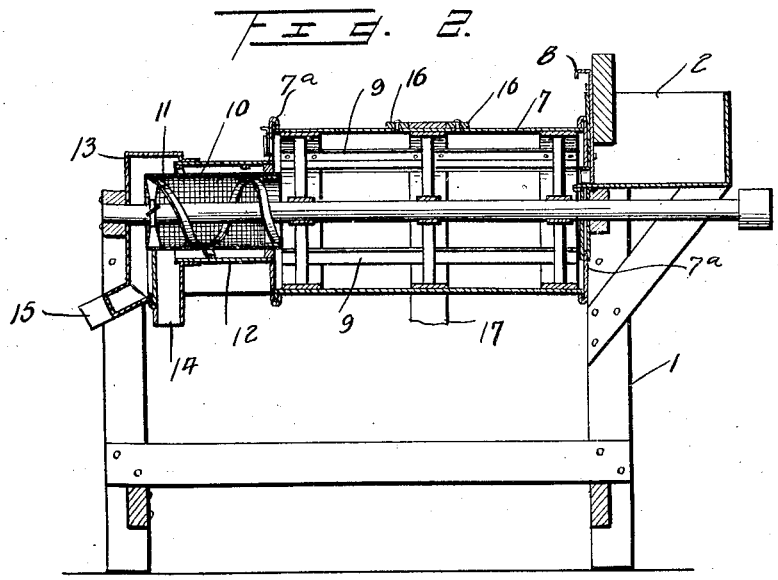
Inventor
C. C. Calkins.

Nov. 8, 1927.  1,648,538
C. C. CALKINS
MACHINE FOR TREATING SEED GRAIN
Filed Nov. 23, 1922  2 Sheets-Sheet 2
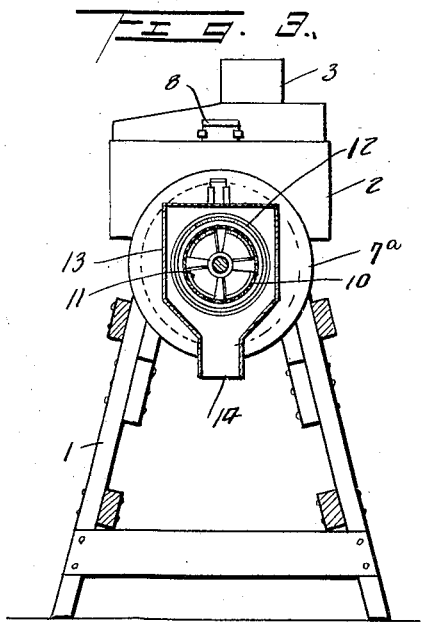
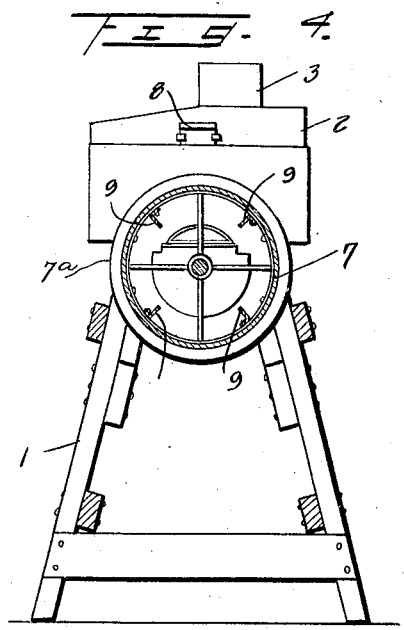
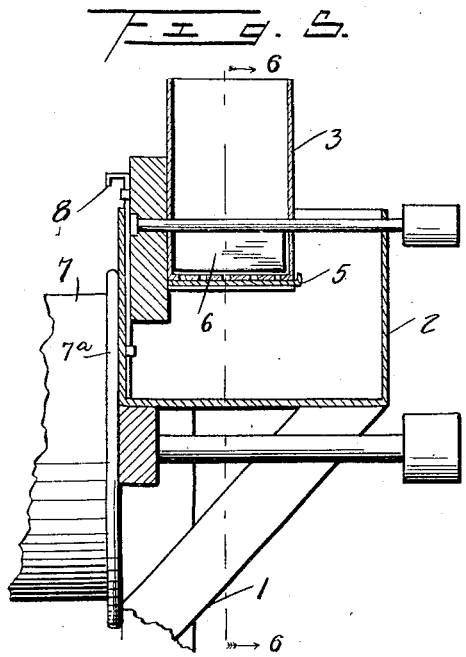
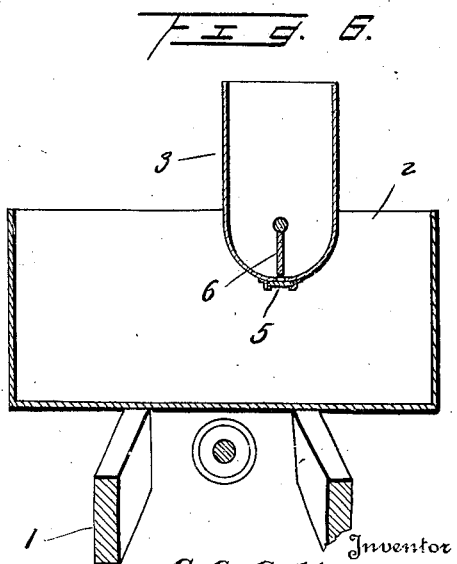
Inventor
C. C. Calkins.
By
Attorney Patented Nov. 8, 1927.

1,648,538

UNITED STATES PATENT OFFICE.

CLAUDE C. CALKINS, OF HEPPNER, OREGON.

MACHINE FOR TREATING SEED GRAIN.

Application filed November 23, 1922. Serial No. 602,873.

The present invention has relation to a machine for treating grain, such as wheat, whereby to kill smut and render the grain free from live smut ready for seeding.

The present invention provides a machine specially adapted for treating grain by the dry method and has for its object to supply a powder, such as copper carbonate, in regulated quantity to mix with the grain and coat the grain while being mixed in a rotary drum, whereby to prevent formation of smut, the excess powder over and above the amount needed to coat grain being separated from the grain preliminary to its discharge from the machine to be used further in the treating of other grain.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is a side view of a machine for treating grain embodying the invention, Figure 2 is a vertical, central longitudinal section thereof, Figure 3 is a transverse section on the line 3—3 of Figure 1, Figure 4 is a cross section on the line 4—4 of Figure 1, Figure 5 is a detail view, and Figure 6 is a sectional view taken on the vertical plane indicated by the line 6—6 of Figure 5, looking in the direction indicated by the arrows.

Corresponding and like parts are referred to in the following description and designated in the several views of the drawings by like reference characters.

The numeral 1 designates a framework which may be of any preferred construction, according to the capacity and finish of the machine. A hopper 2 is located at one end of the framework 1 and is adapted to receive the grain from a fanning mill or other source of supply. A box 3 is arranged in cooperative relation with the hopper 2 and is adapted to contain the copper carbonate or other powder for treating the grain. The bottom has several holes through its center to permit the powder to be discharged on the wheat. A slide 5 controls the number of holes from which the powder is allowed to escape during the operation. An agitator 6 operates in the bottom of the hopper stirring the powder and brushes over the openings as it revolves keeping the powder from packing therein and keeping the holes open at all times. The speed at which the powder is added to the wheat is controlled entirely by the slide 5 which governs the openings in the bottom of the hopper.

A rotary drum 7 is mounted on the framework 1 in such a position as to receive the grain and powder from the hopper 2, a cut-off 8 controlling the delivery of the material from the hopper to the drum. Drum 7 is cylindrical and journaled in stationary end members 7ª. Blades 9 are disposed about the inner side of the drum 7 and extend lengthwise thereof and insure an agitation of the grain and powder, to insure a thorough mixing and rubbing and tumbling contact of the grain and powder, whereby the powder or fungicide is fixed as a coating on the grain. A rotary screen 10 of less diameter than the drum 7 is connected with the delivery end thereof and contains a spiral flight 11 which insures a positive feed of the grain and powder through the rotary screen. The coated grain and powder are restrained from passing to the screen until a sufficient quantity of the material has been accumulated in the drum, and then the material flows continuously from the drum to the screen. A casing 12 encloses the rotary screen 10 and is rotatable therewith and with the drum 7. A box 13, mounted upon the framework 1, receives the delivery end of the casing 12 and rotary screen 10, the latter projecting some distance beyond the casing 12 to effect proper delivery of the grain. The box 13 is provided at its lower end with a spout 14 for the discharge of any excess powder and with a forked spout 15 for the delivery of the grain which is discharged into sacks, not shown, arranged to receive the the grain from the branches of the spout 15. The drum 7 is provided with lagging 16 around a reinforced portion of the drum to which the power is applied by means of a drive belt 17.

In practice, the wheat or other grain to be treated for smut is supplied to the hopper 2 and treated with powder, such as copper carbonate, supplied to the hopper in regulated quantity from the box 3, the grain and powder passing from the hopper 2 into the drum 7. Rotation of the drum 7 effects a thorough agitation of the grain and powder, whereby the grain is thoroughly coated with said powder, the grain and any excess powder passing from the drum 7 into the rotary screen 10 where any loose powder is separated from the grain, the powder being discharged through the spout 14 and the grain through the spout 15. It will thus be understood that the handling of the grain is minimized, since the machine may be arranged to receive the grain from a fanning mill and the grain as it is discharged from the cleaner may be sacked ready for seeding.

It is observed that the grain and powder are contained in a horizontally rotating drum which is practically tight to prevent any waste of the material. It is further noted that the construction is such that the process is continuous, the grain and powder being fed to the drum at one end and discharged from the drum at the opposite end. Any surplus powder is removed from the grain just prior to the discharge of the powder covered grain from the drum so as to be used again in the treatment of other grain. The blades 9 operate as agitators and may be disposed in any preferred way to meet requirements.

What is claimed is:

1. In a grain treating machine, a drum to receive powder-treated grain, stationary end members in which said drum is journaled closing the ends of the drums, means to supply powder-treated grain to the drum through one of said end members, a screen extending from the other end member, a casing fixedly extending from the latter end member and about the screen to receive the sifted material therefrom, the casing terminating short of the discharge end of the screen, and means extending beyond the casing to receive grain discharged through the screen.

2. In a grain treating machine the combination with a rotary shaft and its drum, agitating means in the drum, and said drum having an inlet at one end and a restraining wall at its other end, of a screen of smaller diameter than the drum fixed in said restraining wall and adapted to receive material from the drum, a casing enclosing the screen, a discharge spout for the casing, and a discharge spout for the screen.

In testimony whereof I affix my signature.

CLAUDE C. CALKINS.